US 8,151,921 B2
Apr. 10, 2012

(12) United States Patent
Okabe et al.

(54) VEHICLE FRONT STRUCTURE

(75) Inventors: Kojiro Okabe, Wako (JP); Hidemi Tamaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 227 days.

(21) Appl. No.: 12/681,819

(22) PCT Filed: Dec. 5, 2008

(86) PCT No.: PCT/JP2008/072589
§ 371 (c)(1),
(2), (4) Date: Apr. 6, 2010

(87) PCT Pub. No.: WO2009/072673
PCT Pub. Date: Jun. 11, 2009

(65) Prior Publication Data
US 2010/0231006 A1 Sep. 16, 2010

(30) Foreign Application Priority Data

Dec. 7, 2007 (JP) ................................ 2007-316946
Dec. 7, 2007 (JP) ................................ 2007-316966

(51) Int. Cl.
*B62D 25/08* (2006.01)
(52) U.S. Cl. .................................................. 180/68.4
(58) Field of Classification Search ........ 180/68.4–68.6, 180/271, 274, 311–312; 296/187.09, 203.02
See application file for complete search history.

(56) References Cited

U.S. PATENT DOCUMENTS

| | | | | |
|---|---|---|---|---|
| 3,700,061 A * | 10/1972 | Hortnagl | ........................ | 180/68.4 |
| 4,742,881 A * | 5/1988 | Kawaguchi et al. | ......... | 180/68.4 |
| 5,544,714 A * | 8/1996 | May et al. | ..................... | 180/68.4 |
| 5,573,299 A * | 11/1996 | Masuda | .................... | 296/193.09 |
| 6,260,609 B1 * | 7/2001 | Takahashi | ........................ | 165/69 |
| 6,364,403 B1 * | 4/2002 | Ozawa et al. | ............. | 296/187.09 |
| 6,412,581 B2 * | 7/2002 | Enomoto et al. | ............. | 180/68.4 |
| 6,729,424 B2 * | 5/2004 | Joutaki et al. | ................ | 180/68.4 |
| 7,331,413 B2 * | 2/2008 | Okai et al. | .................... | 180/68.4 |
| 7,766,112 B2 * | 8/2010 | Kapadia et al. | .............. | 180/68.4 |
| 7,861,988 B2 * | 1/2011 | Hamida et al. | ................ | 248/232 |
| 7,886,860 B2 * | 2/2011 | Spieth et al. | .................. | 180/68.4 |
| 8,051,933 B2 * | 11/2011 | Hwang | ........................ | 180/68.4 |
| 2001/0001994 A1 * | 5/2001 | Enomoto et al. | ............. | 180/68.4 |
| 2004/0084236 A1 * | 5/2004 | Okai et al. | .................... | 180/68.4 |
| 2004/0188155 A1 * | 9/2004 | Fujieda | ....................... | 180/68.4 |
| 2004/0195020 A1 * | 10/2004 | Suwa et al. | ................... | 180/68.4 |

(Continued)

FOREIGN PATENT DOCUMENTS

EP 1 072 501 1/2001

(Continued)

*Primary Examiner* — J. Allen Shriver, II
*Assistant Examiner* — James Triggs
(74) *Attorney, Agent, or Firm* — Rankin, Hill & Clark LLP

(57) ABSTRACT

A vehicle front structure is disclosed in which a bulkhead (15) is provided between left and right front side frames (11), and a cooling unit (17) is provided having a radiator in the bulkhead. An upper support bracket (41) and a lower support bracket (42) for supporting upper and lower parts of the cooling unit are provided so as to be capable of sliding in a rearward direction of the vehicle body. The upper and lower support brackets slide in the rearward direction of the vehicle body when the vehicle is involved in a light collision, whereby the cooling unit moves rearward while kept in a vertical state and damage is reduced.

3 Claims, 10 Drawing Sheets

U.S. PATENT DOCUMENTS

| | | | |
|---|---|---|---|
| 2007/0040414 A1 | 2/2007 | Frederick et al. | |
| 2007/0125525 A1* | 6/2007 | Heine | 165/121 |
| 2008/0061601 A1* | 3/2008 | Hemmersmeier | 296/193.03 |
| 2008/0308333 A1* | 12/2008 | Kapadia et al. | 180/68.4 |

FOREIGN PATENT DOCUMENTS

| | | |
|---|---|---|
| EP | 1 859 983 | 11/2007 |
| JP | 2001-187588 | 7/2001 |
| WO | 2007/066035 | 6/2007 |

* cited by examiner

VEHICLE FRONT STRUCTURE

TECHNICAL FIELD

The present invention relates to a vehicle front structure provided with a bulkhead in a front side frame and provided with a cooling unit in the bulkhead.

BACKGROUND ART

Vehicle front structures include those in which a bulkhead is provided on the front-end part of the left and right front side frames, and a cooling unit is provided in the bulkhead.

The cooling unit is supported by an upper beam part and a lower beam part, which are constituent members of the bulkhead. The upper part of the cooling unit has a vehicle front structure moveably mounted facing toward the rear of the vehicle body on the upper beam part of the bulkhead as disclosed in JP 2001-187588 A.

In accordance with the vehicle front structure disclosed in JP 2001-187588 A, when an impact load is applied to the front part of the vehicle body due to a light collision, for example, the upper part of the cooling unit moves toward the rear of the vehicle body about the lower part of the cooling unit as a support point, and the cooling unit can be prevented from being damaged by the impact load.

However, the lower part of the cooling unit of the vehicle front structure disclosed in JP 2001-187588 A is held in a fixed state and the lower part of the cooling unit may be damaged by an impact load because only the upper part of the cooling unit moves rearward of the vehicle body about the lower part of the cooling unit as a support point.

Ordinarily, the drive source (engine) is disposed on the vehicle body rearward of the cooling unit. Accordingly, the upper part of the cooling unit may interfere with the drive source (engine) and be damaged when the upper part of the cooling unit has moved in the rearward direction of the vehicle body.

DISCLOSURE OF THE INVENTION

It is therefore an object of the present invention to provide a vehicle front structure that can prevent damage to a cooling unit in the case of a light collision.

According to a first aspect of the present invention, there is provided a front structure of a vehicle, which structure comprises: left and right front side frames extending in a longitudinal direction of a vehicle body; a bulkhead provided between the left and right front side frames; and a cooling unit provided on the bulkhead and having an upper part and a lower part, wherein the upper part of the cooling unit is supported by an upper beam part of the bulkhead via an upper support bracket, the upper beam part being supported slidably or deformably in a rearward direction of the vehicle body, and the lower part of the cooling unit is supported by a lower beam part of the bulkhead via a lower support bracket which is supported slidably or deformably in the rearward direction of the vehicle body, so that the upper beam part and the lower support bracket move in the rearward direction of the vehicle body when the vehicle is involved in a light collision.

In this manner, the upper beam part and the lower support bracket each move in the rearward direction of the vehicle body. Therefore, the entire cooling unit is moved substantially horizontal in the rearward direction of the vehicle body and the entire cooling unit can be protected from being damaged due to an impact load.

The upper beam part is disposed above the cooling unit and can be moved in the rearward direction of the vehicle body together with the cooling unit. The cooling unit can thereby be prevented by the upper beam part from directly interfering with the drive source (engine), and the upper part of the cooling unit can be protected from being damaged.

The entire cooling unit is thus moved in the rearward direction of the vehicle body, and the upper beam part is moved in the rearward direction of the vehicle body together with the cooling unit, whereby the cooling unit can be effectively prevented from being damaged when the vehicle is involved in a light collision.

Preferably, the upper and lower support brackets are provided, respectively, with load-bearing parts protruding forwardly of the vehicle body. Thus, an impact load during a light collision can be received at an early stage by the load receiving part. The entire cooling unit is thereby moved at an early stage in the rearward direction of the vehicle body, and the cooling unit can be effectively prevented from being damaged.

Desirably, rearward-moving loads for causing the upper beam part and the lower support bracket to slide or deform in the rearward direction of the vehicle body are made smaller than buckling loads of the left and right front side frames. Thus, the entire cooling unit can be reliably moved in the rearward direction of the vehicle body before the left and right front side frames undergo buckling deformation. The entire cooling unit is efficiently moved in the rearward direction of the vehicle body and the cooling unit can be efficiently prevented from being damaged.

In a preferred form, the structure further comprises spring members for supporting the upper beam member and the lower support bracket in such a manner as to be slidable in the rearward direction of the vehicle. Therefore, the supporting force of the upper beam part and the lower support bracket can be suitably maintained by supporting the upper beam part and the lower support bracket with the aid of a spring force, and the entire cooling unit can be smoothly moved in the rearward direction of the vehicle body.

Preferably, the bulkhead is mounted on an upper side frame that is provided to an upper member disposed outside of each of the left and right front side frames and on a subframe bracket provided to each of the left and right front side frames, and includes a side leg part provided to the subframe bracket, the upper beam part being provided to the side leg part, the side leg part is halved into an upper leg part and a lower leg part disposed one above the other, the upper leg part is detachably joined to the lower leg part, and the upper beam part and the upper side frame are detachably joined to the upper end part of the upper leg part.

For example, it is known that substantially the upper half of the side leg part deforms when an impact load is applied to the front part of a vehicle body when the vehicle undergoes a light collision. Therefore, it is preferred that the upper half of the side leg part be detachably mounted.

On the other hand, it is known that substantially the lower half of the side leg part does not deform when an impact load is applied to the front part of the vehicle body in a light collision. Therefore, it is preferred that the lower half of the side leg part be securely mounted without consideration given to detachability in order to assure rigidity of the front part of the vehicle body.

In view of the above, the side leg part is divided into two, i.e., upper and lower leg parts, and the upper beam part and the upper side frame are detachably joined the upper end part of the upper leg part so as to detachably join the upper leg part to the lower leg part. The upper leg part can thereby be replaced by a new member in a simple operation when the upper leg portion has deformed due to an impact load, and repair can be simplified.

It is desirable that the lower leg part be joined by spot welding to the subframe bracket. Therefore, the lower leg part can be securely mounted in a simple operation to the subframe bracket without the use of numerous bolts. In particular, the lower leg part can be securely joined to the subframe bracket by increasing the number of weld locations, and the rigidity of the front part of the vehicle body can be increased.

The upper leg part may be detachably joined using a plurality of bolts to the lower leg part while the upper end part of the upper leg part may be detachably joined using a plurality of bolts to the upper beam part and the upper side frame. Detachment is facilitated by using bolts.

BRIEF DESCRIPTION OF THE DRAWINGS

Certain preferred embodiments of the present invention will be described in detail below, by way of example only, with reference to the accompanying drawings, in which.

BEST MODE FOR CARRYING OUT THE INVENTION

Reference is now made to FIGS. 1 to 9 showing a vehicle front structure 10 according to a first embodiment. Front side frames, upper members, upper side frames, and subframe brackets constituting the framework of the vehicle front structure 10 are symmetrical members. Therefore, only the left-side members will be described, and a description of the right-side members will be omitted.

Figure 1:
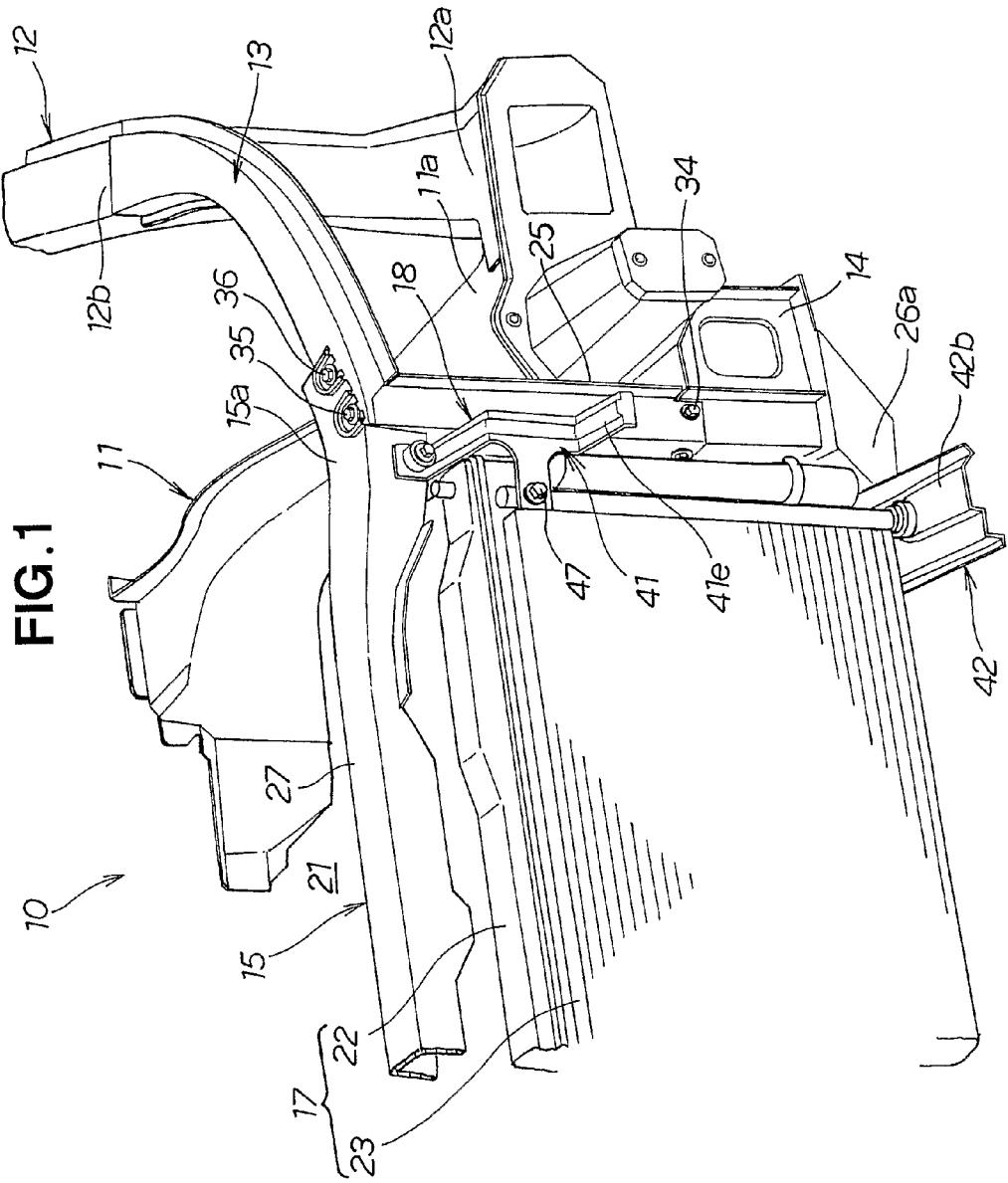
FIG. 1 is a perspective view of a vehicle front structure according to a first embodiment, as seen from the forward direction.

As shown in FIG. 1, the vehicle front structure 10 has left and right front side frames 11 (the right front side frame is omitted in the diagram) provided to the left and right sides, respectively, of the front part of the vehicle body; left and right upper members 12 (the right upper member is omitted in the diagram) provided the outside and above the left and right front side frames 11, respectively; left and right upper side frames 13 (the right upper side frame is omitted in the diagram) provided to the left and right upper members 12; left and right subframe brackets 14 (the right subframe bracket is omitted in the diagram) provided to the front end of the left and right front side frames 11; a bulkhead 15 provided to the left and right subframe brackets 14 and the left and right upper side frames 13, and a cooling unit support member 18 for supporting a cooling unit 17, being provided to the bulkhead 15.

The cooling unit 17 has a radiator 22 provided to an engine compartment 21, and a condenser 23 provided in front of the radiator 22. The condenser 23 cools and liquefies refrigerant gas for an air conditioner, for example.

The left front side frame 11 is disposed on the left side of the front part of the vehicle body and extends in the longitudinal direction of the vehicle body.

The left upper member 12 is disposed above and outward of the left front side frame 11, the rear end part is connected to a left front pillar (not shown), and the front end part 12a is joined by welding (e.g., spot welding) to the front-end part 11a of the left front side frame 11.

The left upper side frame 13 extends in a curved shape from substantially the center part 12b of the left upper member 12 to the left upper end part 15a of the bulkhead 15 forward of the vehicle body and toward the center of the vehicle width.

Figure 3:
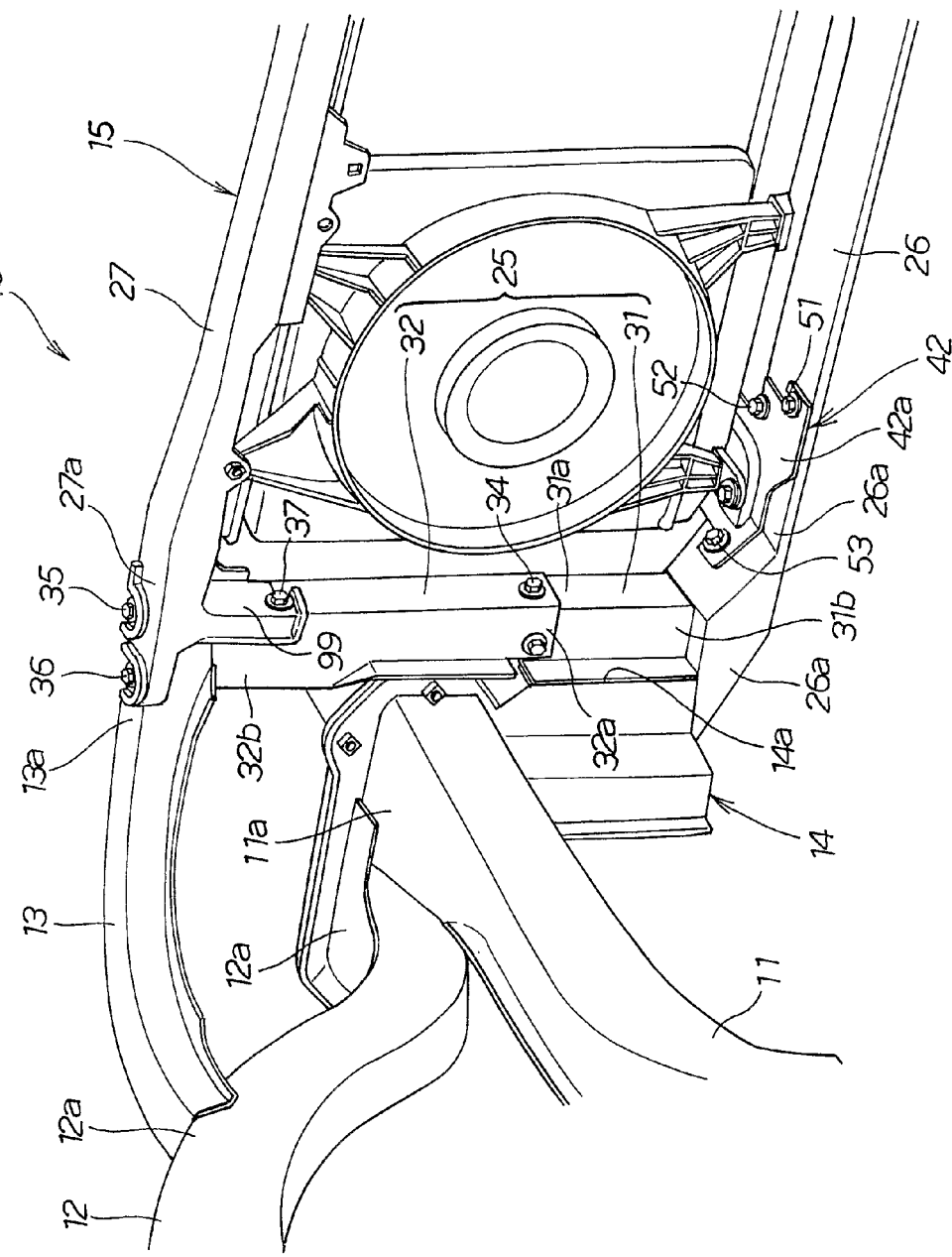
FIG. 3 is a perspective view of the vehicle front structure of FIG. 1, as seen from the rearward direction.

The left subframe bracket 14 is integrally mounted on the front-end part 11a of the left front side frame 11, as shown in FIG. 3.

The bulkhead 15 is a frame body formed in a substantially rectangular shape from left and right side leg parts 25 (the right side leg part is not shown) provided to the left and right subframe brackets 14, a lower beam part 26 (see FIG. 2) provided to the lower end part of the side leg part 25, and an upper beam part 27 provided to the upper end part of the side leg part 25.

Figure 2:
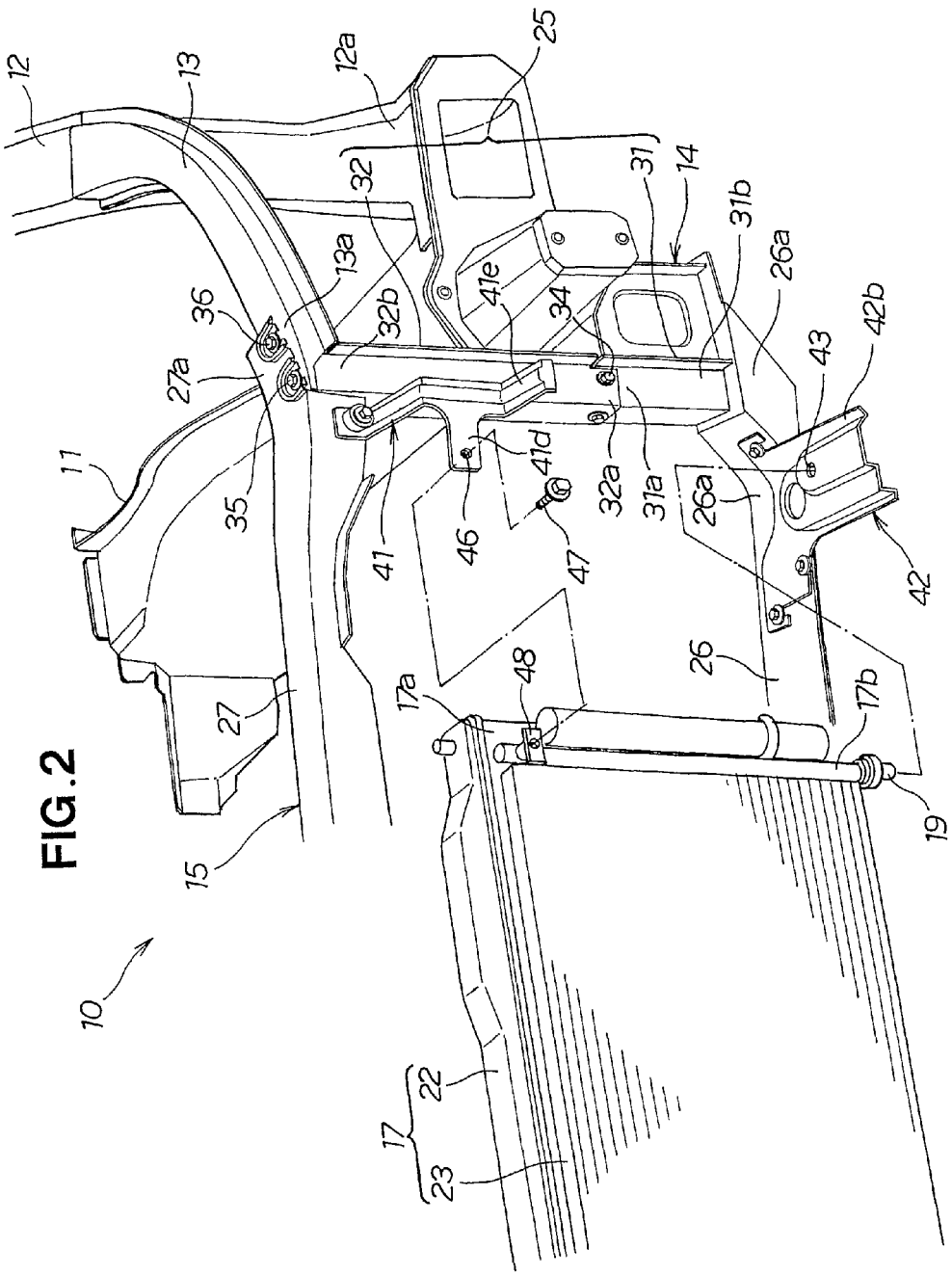
FIG. 2 is a perspective view showing a state in which the cooling unit is disassembled from the front structure of FIG. 1.

The left side leg part 25 of the bulkhead 15 is bisected into a lower leg part 31 and an upper leg part 32, as shown in FIGS. 2 and 3.

The lower leg part 31 is securely joined, e.g., by spot welding so as to make detachment difficult to an inside wall 14a (FIG. 3) of the left subframe bracket 14 in a location constituting the base part of the left side leg part 25. Here, the phrase "securely joined so as to make detachment difficult" refers to increasing rigidity by increasing the number of spot welding locations.

A lower end part 32a of the upper leg part 32 can be detachably joined to an upper end part 31a of the lower leg part 31 in an easy manner by using a plurality of intermediate bolts 34. Here, the phrase "detachably joined in an easy manner" may, for example, refer to the ability of the parts to be readily attached to and detached from each other by reducing the number of bolts or spot weld locations.

In the upper leg part 32, a front end part 13a of the left upper side frame 13 is detachably joined to the upper leg part 32 via first and second upper bolts 35, 36.

A left end part 27a of the upper beam part 27 is detachably joined to the upper leg part 32 with the aid of the first and second upper bolts 35, 36 and a lateral bolt 37.

The reason for bisecting the left side leg part 25 into the lower leg part 31 and the upper leg part 32 is described later.

The lower beam part 26 spans a lower end part 31b of the left and right lower leg parts 31. Specifically, a left end part 26a of the lower beam part 26 is joined by, e.g., spot welding to the lower end part 31b of the lower leg part 31. Although not depicted, the right end part is joined by, e.g., spot welding to the lower end part of the right lower leg part.

The upper beam part 27 spans an upper end part 32b of the left and right upper leg parts 32. Specifically, the left end part 27a of the upper beam part 27 is mounted using the first and second upper bolts 35, 36 and the lateral bolt 37 on the upper end part 32b of the left upper leg part 32 in the manner described above. Although not depicted, the right end part is mounted using the first and second bolts and the lateral bolt to the upper end part of the right upper leg part.

Figure 4:
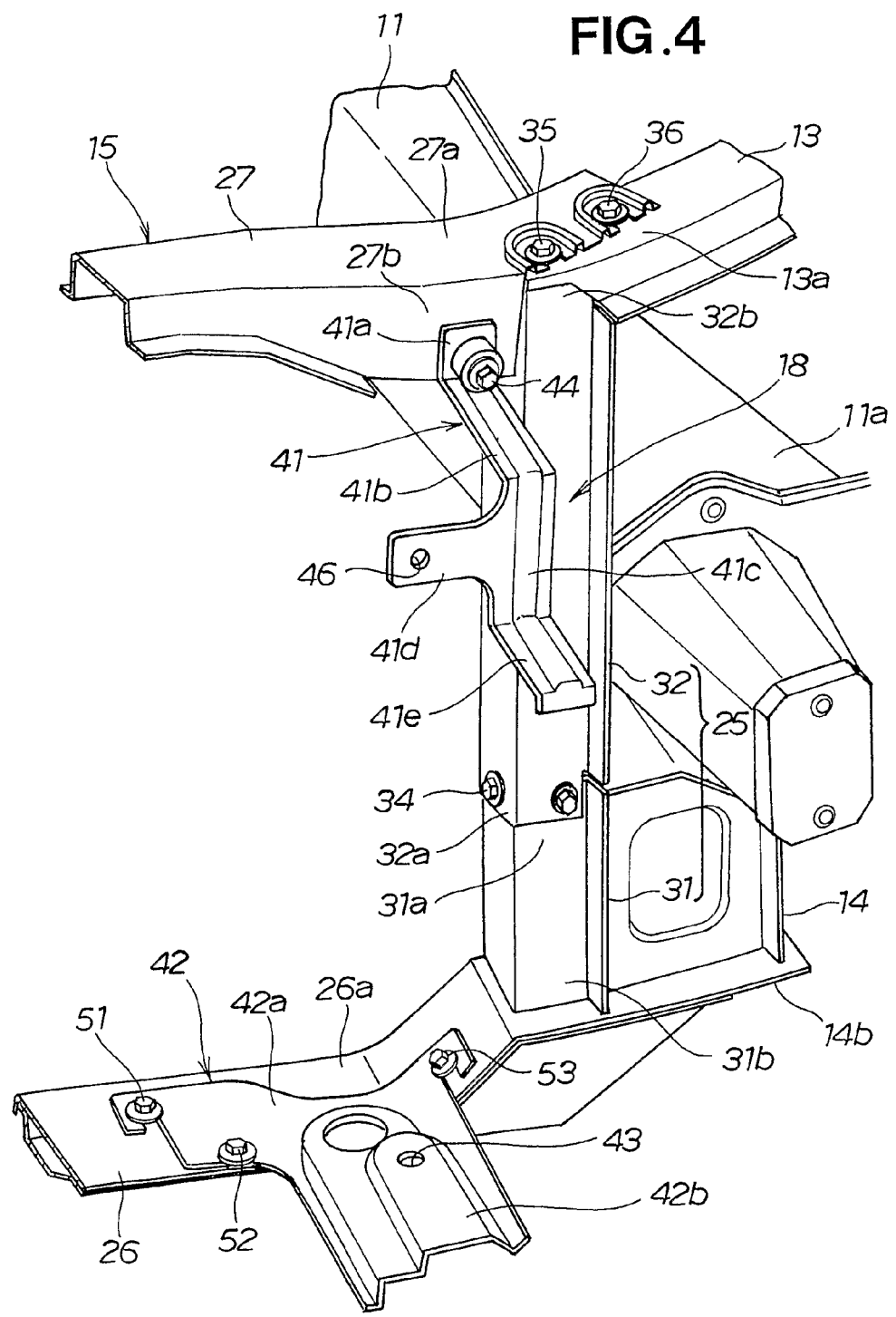
FIG. 4 is a perspective view showing a mounted state of the upper and lower support brackets of FIG. 1.

Cooling system support means 18 for supporting the cooling unit 17 shown in FIG. 2 is provided to the bulkhead 15, as shown in FIG. 4.

The cooling system support means 18 has left and right upper support brackets 41 (the right upper support bracket is not shown) provided to the left and right end parts 27a of the upper beam part 27, and left and right lower support brackets 42 (the right lower support bracket is not shown) provided to the left and right end parts 26a of the lower beam part 26.

A bumper beam, not shown, is provided to the vehicle body front-side of the cooling system support means 18. The impact load when the vehicle has undergone a collision is transmitted to the cooling system support means 18 via the bumper beam.

The left upper support bracket 41 is mounted so as to protrude in the forward direction of the vehicle body from a front wall 27b in the left end part 27a of the upper beam part 27.

In other words, a rear end part 41a of the left upper support bracket 41 is mounted using a bolt 44 to the front wall 27b of the upper beam part 27. A horizontal support location 41b protrudes from the rear end part 41a in the forward direction of the vehicle body. The perpendicular location 41c extends downward from the distal end of the horizontal support location 41b. A mounting flap 41d extends from the center of the perpendicular location 41c to toward the center of the vehicle width. An upper load receiving part 41e protrudes horizontally from the lower end of the perpendicular location 41c in the forward direction of the vehicle body.

A mounting hole 46 is formed in the end part of the mounting flap 41d.

A bolt 47 is inserted into the mounting hole 46, as shown in FIG. 2, and the left upper support bracket 41 is threadably joined to the cooling unit 17 by threading the bolt 47 that has protruded from the mounting hole 46 into a mounting part 48 of the cooling unit 17. A left upper end part (upper part) 17a of the cooling unit 17 is thereby supported by the mounting flap 41d.

In other words, the left upper end part 17a of the cooling unit 17 is supported by the left end part 27a of the upper beam part 27 via the mounting flap 41d. In this state, the upper load receiving part 41e protrudes from the cooling unit 17 in the forward direction of the vehicle body, as shown in FIG. 1.

A right upper support bracket is symmetrical to the left upper support bracket. Therefore, a description of the right upper support bracket is omitted.

The left lower support bracket 42 protrudes from the left end part 26a of the lower beam part 26 in the forward direction of the vehicle body.

In other words, a rear end part 42a of the left and right lower support brackets 42 is detachably mounted using first to third lower bolts 51, 52, 53 on the left end part 26a of the lower beam part 26. A lower load receiving part 42b protrudes from the rear end part 42a in the forward direction of the vehicle body.

A support hole 43 is formed substantially in the center of the lower load receiving part 42b. A left lower end part (lower part) 17b of the cooling unit 17 is supported by the lower load receiving part 42b by fitting a stop protrusion 19 (FIG. 2) of the cooling unit 17 into the support hole 43 of the lower load receiving part 42b.

In other words, the left lower end part 17b (FIG. 2) of the cooling unit 17 is supported by the left end part 26a of the lower beam part 26 via the lower load receiving part 42b.

Figure 5:
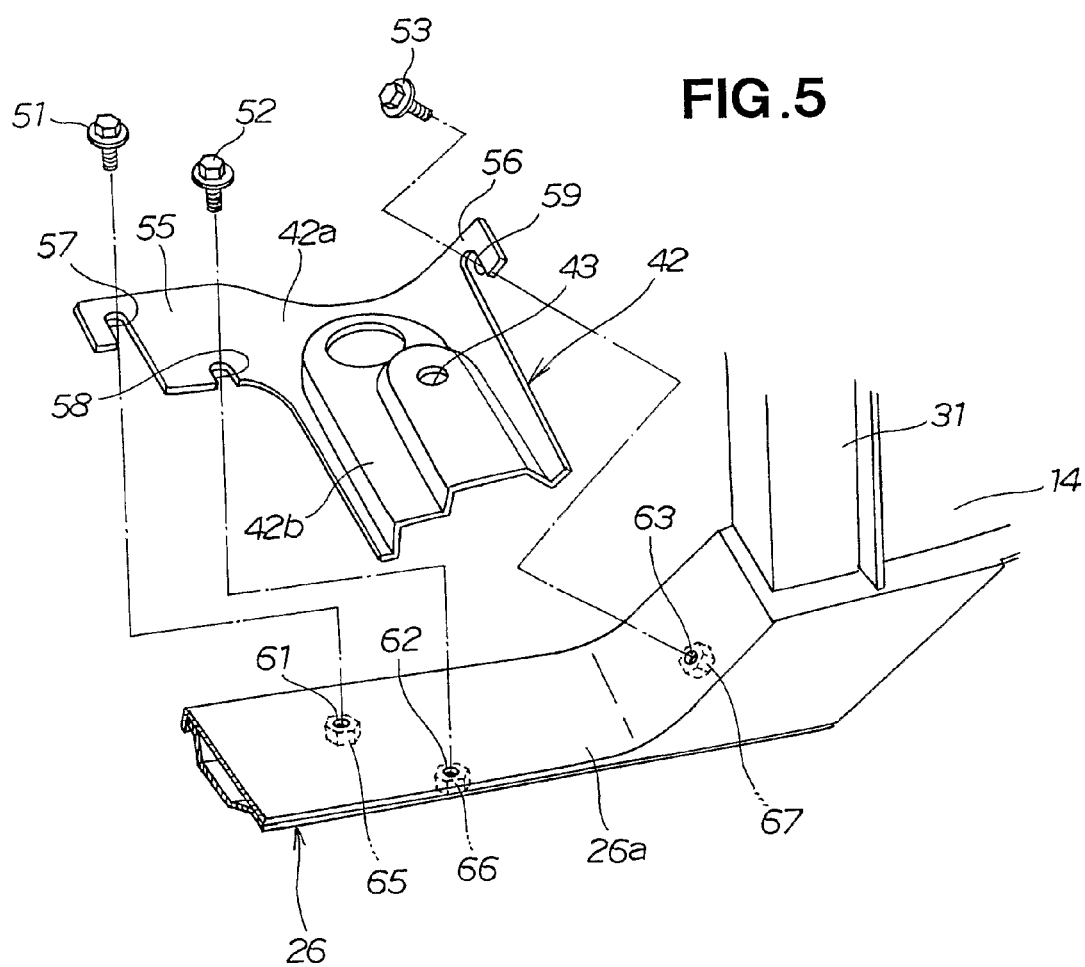
FIG. 5 is a perspective view in which the lower support bracket and the lower beam part of FIG. 4 are disassembled.

The left lower support bracket 42 has inside and outside side parts 55, 56 extending outward from the lower load receiving part 42b of the rear end part 42a in the width direction of the vehicle, as shown in FIG. 5.

A pair of lower inside slide grooves 57, 58 is formed in the inside part 55. Each of the pair of lower inside slide grooves 57, 58 are opened in the forward direction of the vehicle body.

A lower outside slide groove 59 is formed in the outside part 56. The lower outside slide groove 59 is opened in the vehicle body direction.

First to third lower mounting holes 61, 62, 63 are formed in the left end part 26a of the lower beam part 26. First to third lower nuts 65, 66, 67 are coaxially disposed in relation to the mounting holes 61 to 63, respectively, and the lower nuts 65 to 67 are welded to the reverse surface of the left end part 26a.

First to third mounting holes (not shown) are also formed in the right end part of the lower beam part 26 in the same manner as the left end part 26a, and first to third lower nuts (not shown) are welded to the beam part.

First to third lower bolts 51, 52, 53 are inserted into the pair of lower inside slide grooves 57, 58 and the lower outside slide groove 59, respectively, and the first to third lower bolts 51, to 53 that protrude from each slide groove 57 to 59 are inserted into first to third lower mounting holes 61 to 63 of the left end part 26a and are threaded into first to third lower nuts 65 to 67. The left lower support bracket 42 is thereby detachably joined to the left end part 26a of the lower beam part 26 using first to third lower bolts 51 to 53 and first to third lower nuts 65 to 67.

The left lower support bracket 42 is supported so as to capable of sliding in the rearward direction of the vehicle body by the first to third lower bolts 51 to 53 because the pair of lower inside slide grooves 57, 58 and the lower outside slide groove 59 are each opened in the forward direction of the vehicle body. An impact load that acts on the left lower support bracket 42 from the forward direction to the rearward direction of the vehicle body during, e.g., a light collision, exceeds the joining force of each of the first to third lower bolts 51 to 53 and slidably moves the left lower support bracket 42 in the rearward direction of the vehicle body.

The right lower support bracket is symmetrical to the left lower support bracket 42. Therefore, a description of the right lower support bracket is omitted.

Figure 6:
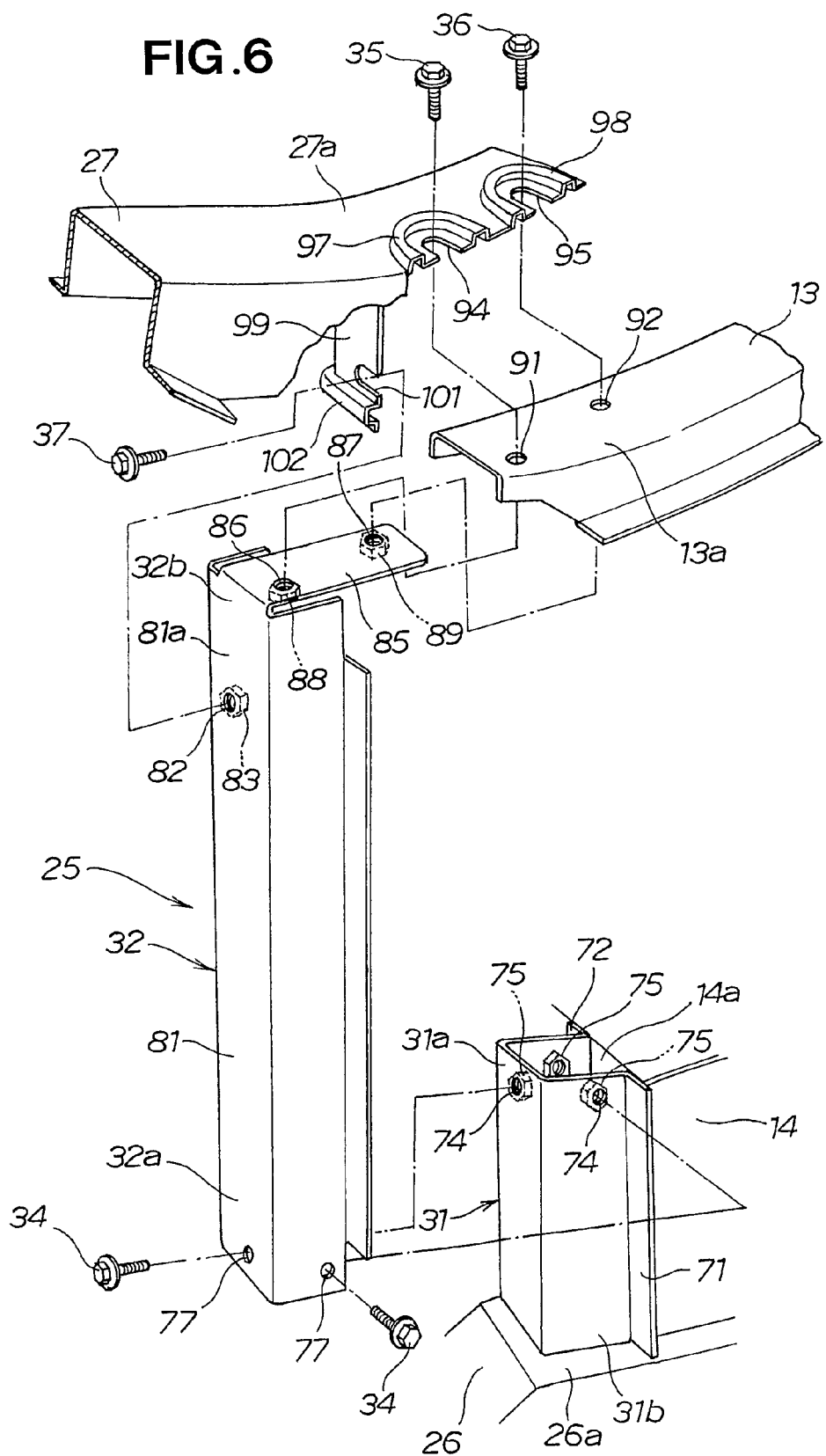
FIG. 6 is a perspective view in which the side leg part, the upper beam part, and the upper side frame of FIG. 4 are disassembled.

The lower leg part 31 of the left side leg part 25 is formed substantially in a cross-sectional U-shape, as shown in FIG. 6, and has a pair of extension pieces 71, 72. The extension pieces 71, 72 are joined to the inside wall 14a of the left subframe bracket 14 by, e.g., spot welding. Therefore, the lower leg part 31 is mounted on the left subframe bracket 14 without the use of numerous bolts.

The left end part 26a of the lower beam part 26 is joined by, e.g., spot welding to the lower end part 31b of the lower leg part 31 and the bottom part 14b (FIG. 4) of the left subframe bracket 14.

In this manner, the lower leg part 31 of the left side leg part 25 is joined by, e.g., spot welding, to the left subframe bracket 14, and the lower beam part 26 is joined by, e.g., spot welding, to the lower leg part 31 and the left subframe bracket 14, whereby the rigidity of the vehicle front structure 10 (the front part of the vehicle body in particular) can be assured.

The lower leg part 31 has a plurality of intermediate mounting holes 74 formed in the upper end part 31a, each of a plurality of intermediate nuts 75 is coaxially disposed in relation to the intermediate mounting holes 74, and the intermediate nuts 75 are welded to the rear surface of the upper end part 31*a*.

The upper leg part 32 of the left side leg part 25 is formed substantially in a cross-sectional U-shape, and a plurality of intermediate mounting holes 77 is formed in the lower end part 32*a*.

Intermediate bolts 34 are inserted into each of the plurality of intermediate mounting holes 77 of the upper leg part 32, and the intermediate bolts 34 protruding from the plurality of intermediate mounting holes 77 are inserted into the plurality of intermediate mounting holes 74 of the lower leg part 31 and threaded into each of the intermediate nuts 75. The lower end part 32*a* of the upper leg part 32 is thereby detachably joined by the plurality of bolts 34 to the upper end part 31*a* of the lower leg part 31.

The upper leg part 32 has a lateral mounting hole 82 formed in an upper end part 81*a* of an inside wall 81, and a lateral nut 83 coaxially disposed in relation to the lateral mounting hole 82 is welded to the rear surface of the inside wall 81.

The upper leg part 32 has a horizontal mounting plate 85 bent so as to extend from the upper end part 81*a* of the inside wall 81 in the outward direction of the vehicle body. A pair of upper mounting holes 86, 87 is formed in the horizontal mounting plate 85, and first and second upper nuts 88, 89 coaxially disposed in relation to the pair of upper mounting holes 86, 87 are welded to the rear surface of the horizontal mounting plate 85.

A pair of mounting holes 91, 92 is formed in the front end part 13*a* of the left upper side frame 13. The pair of mounting holes 91, 92 is coaxially disposed in relation to the upper mounting holes 86, 87, respectively, of the horizontal mounting plate 85.

A pair of upper slide grooves 94, 95 is formed in the left end part 27*a* of the upper beam part 27. The pair of upper slide grooves 94, 95 is each opened in the forward direction of the vehicle body.

Substantially U-shaped ridge parts 97, 98 are formed on the external peripheral portion of the pair of upper slide grooves 94, 95, respectively. The periphery of the pair of upper slide grooves 94, 95 is reinforced by forming the pair of ridge parts 97, 98.

A stop piece 99 (see FIG. 3) extends downward from the left end part 27*a* of the upper beam part 27 so as to face the inside wall 81 of the upper leg part 32.

A lateral slide groove 101 is formed in the stop piece 99. The lateral slide groove 101 is open in the forward direction of the vehicle body. A lateral ridge part 102 is formed in the vicinity of the lower side of the lateral slide groove 101. The vicinity of the lower side of the lateral slide groove 101 is reinforced by forming the lateral ridge part 102.

The first and second upper bolts 35, 36 are inserted into the pair of upper slide grooves 94, 95, respectively, and the first and second upper bolts 35, 36 that have protruded from each of the pair of upper slide grooves 94, 95 are inserted into the pair of mounting holes 91, 92 of the left upper side frame 13. Each of the inserted upper bolts 35, 36 are inserted into the upper mounting holes 86, 87 of the upper leg part 32 and are threaded into the first and second upper nuts 88, 89. The lateral bolt 37 is inserted into the lateral slide groove 101, and the lateral bolt 37 that has protruded from the lateral slide groove 101 is inserted into the lateral mounting hole 82 of the upper leg part 32 and threaded into the lateral nut 83. The front end part 13*a* of the left upper side frame 13 is thereby detachably joined to the upper end part 32*b* of the upper leg part 32 with the aid of the first and second upper bolts 35, 36 and the first and second upper nuts 88, 89. The left end part 27*a* of the upper beam part 27 is furthermore detachably joined to the upper end part 32*b* of the upper leg part 32 with the aid of the first and second upper bolts 35, 36 and the first and second upper nuts 88, 89, as well as the lateral bolt 37 and the lateral nut 83.

In this manner, the left end part 27*a* of the upper beam part 27 is joined to the upper end part 32*b* of the upper leg part 32 with the aid of the first and second upper bolts 35, 36 inserted into the pair of upper slide grooves 94, 95, as well as the lateral bolt 37 inserted into the lateral slide groove 101.

The upper beam part 27 is slidably supported in the rearward direction of the vehicle body by the first and second upper bolts 35, 36 and the lateral bolt 37 because each of the pair of upper slide grooves 94, 95 and the lateral slide groove 101 is open in the forward direction of the vehicle body as described above. An impact load that acts on the upper beam part 27 from the forward direction of the vehicle body during, e.g., a light collision exceeds the joining force of each of the first and second upper bolts 35, 36 and the lateral bolt 37, whereby the upper beam part 27 is slidably moved in the rearward direction of the vehicle body.

The rearward-moving load that slidably moves the left and right lower support brackets 42 (FIG. 5) integrally (simultaneously) with the upper beam part 27 in the rearward direction of the vehicle body is set to be less than the buckling load of the left and right front side frames 11. Therefore, the entire cooling unit 17 (FIG. 1) can reliably move in the rearward direction of the vehicle body prior to the left and right front side frames 11 buckling and deforming.

Next, an example of causing the upper beam part 27 and the left and right lower support brackets 42 to slidably move in the rearward direction of the vehicle body due to a light collision will be described with reference to FIGS. 7 to 9.

Figure 7:
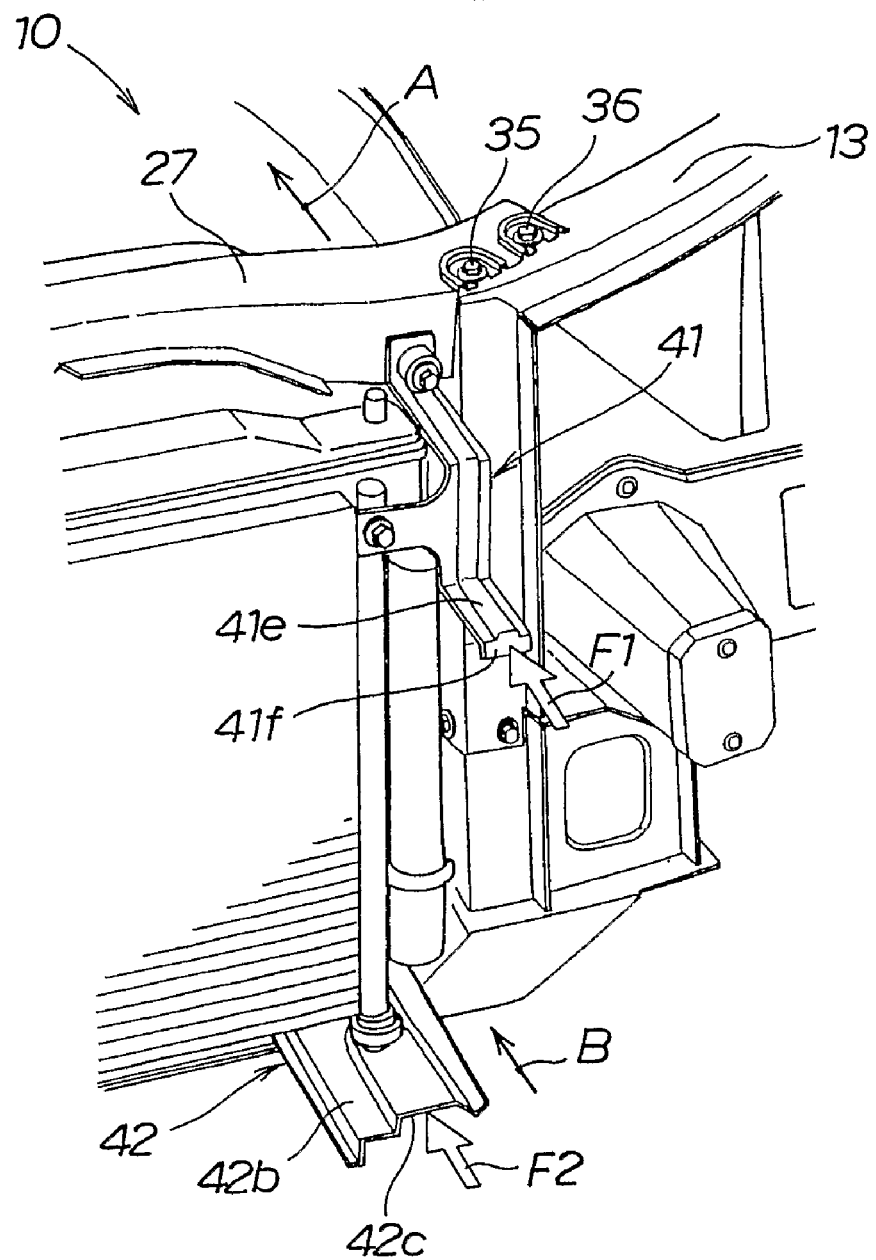
FIG. 7 is a view showing an example in which an impact load is applied to the front structure of FIG. 1.

In FIG. 7, a light impact load acts on the bumper beam (not shown) when the vehicle has engaged in a light collision. The light collision load that has acted on the bumper beam is transferred in the manner shown by the arrow as the impact load F1 on a front end 41*f* of the upper load receiving part 41*e* provided to the left upper support bracket 41, and is transferred in the manner shown by the arrow as the impact load F2 on a front end 42*c* of the lower load receiving part 42*b* provided to the left lower support bracket 42.

When the sum of the impact load F1 and the impact load F2, i.e., the impact load (F1+F2), is set to be the rearward-moving load, the impact load (F1+F2) is less than the buckling load of the left front side frame 11.

In the first embodiment, an example of the left side area of the vehicle front structure 10 is shown in order to facilitate the understanding of the configuration, but when consideration is given to the entire vehicle front structure 10, the rearward-moving load is reduced to less than the sum of the buckling load of the left and right front side frames 11.

Figure 8A:
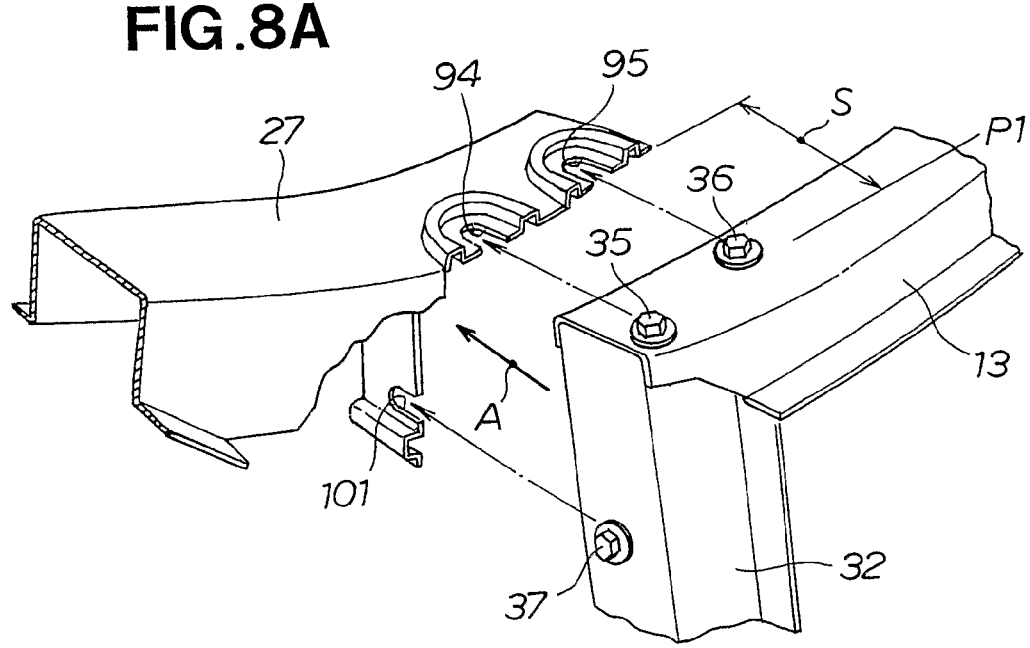
FIGS. 8A and 8B are views showing a state in which the upper beam part and the lower support bracket of FIG. 4 slide in the rearward direction of the vehicle body.

The upper beam part 27 is slidably supported in the rearward direction of the vehicle body by the first and second upper bolts 35, 36 and the lateral bolt 37 (see FIG. 8A). The upper beam part 27 can be made to slide in the rearward direction of the vehicle body in a simple configuration with the aid of the first and second upper bolts 35, 36 and the lateral bolt 37 by providing the pair of upper slide grooves 94, 95 and the lateral slide groove 101 to the upper beam part 27.

Figure 8B:
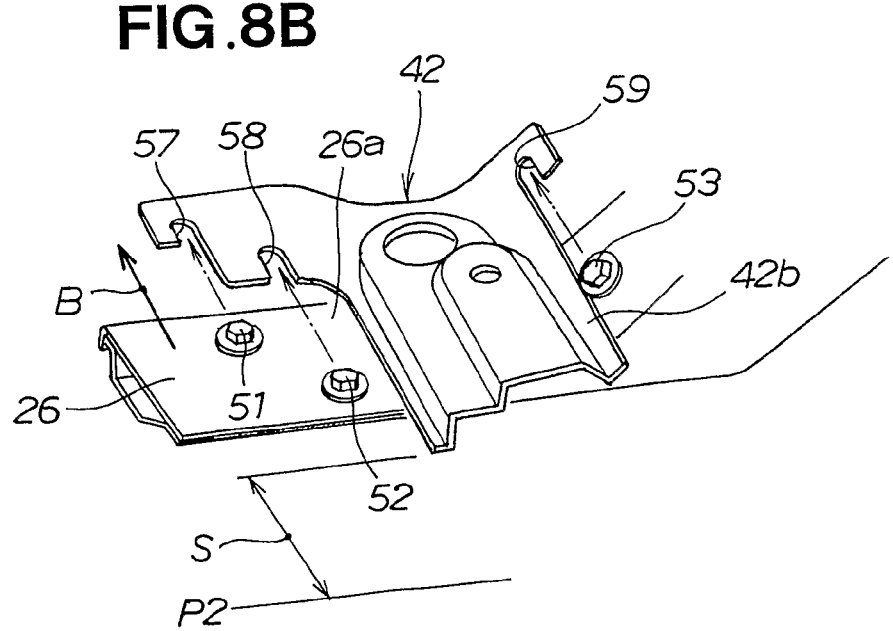

The left lower support bracket 42 is slidably supported in the rearward direction of the vehicle body by the first to third lower bolts 51, 52, 53, as shown in FIG. 8B. The left lower support bracket 42 can be made to slide in the rearward direction of the vehicle body in a simple configuration with the aid of the first to third lower bolts 51, 52, 53 by providing the pair of lower inside slide grooves 57, 58 and the lower outside slide groove 59 to the left lower support bracket 42.

In FIG. 8A, the impact load F1 acts on the front end 41f of the upper load receiving part 41e, whereby the upper beam part 27 slidably moves in the manner shown by the arrow A in the rearward direction of the vehicle body, as shown in FIG. 7.

In FIG. 8B, the impact load F2 acts on the front end 42c of the lower load receiving part 42b, whereby the left lower support bracket 42 slidably moves in the manner shown by arrow B in the rearward direction of the vehicle body, as shown in FIG. 7.

Figure 9:
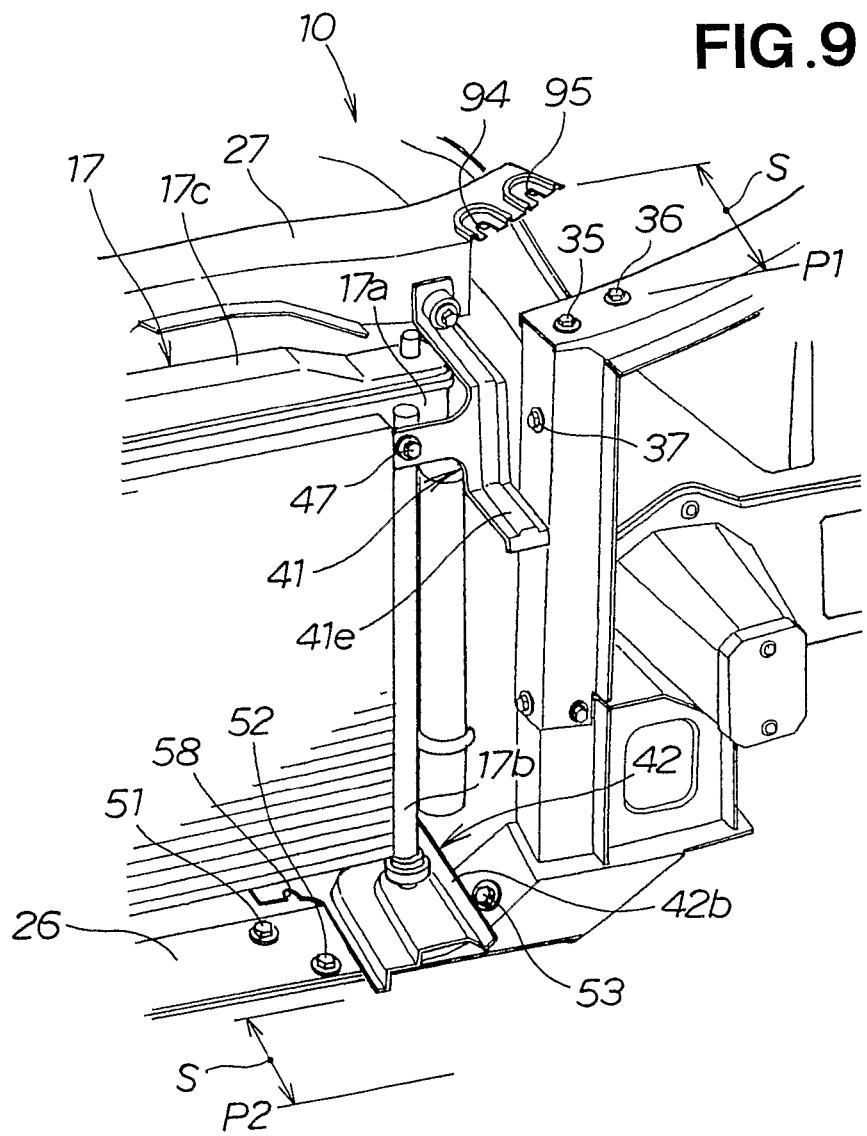
FIG. 9 is a view showing a state in which the cooling unit of FIG. 1 moved in the rearward direction of the vehicle body.

The left upper end part 17a of the cooling unit 17 is supported by the upper beam part 27 via the left upper support bracket 41, as shown in FIG. 9. The left lower end part 17b of the cooling unit 17 is supported by the left lower support bracket 42. Therefore, the cooling unit 17 is supported by the upper beam part 27 and the left lower support bracket 42. Accordingly, the upper beam part 27 slidably moves a distance S in the rearward direction of the vehicle body and the left lower support bracket 42 slidably moves over a distance S toward the rear of the vehicle body, whereby the cooling unit 17 moves in a substantially horizontal manner over a distance S toward the rear of the vehicle body.

In this manner, the entire cooling unit 17 is moved in a substantially horizontal manner toward the rear of the vehicle body, and the entire cooling unit 17 is protected from damage from an impact load.

The upper beam part 27 is positioned above an upper part (entire upper part) 17c of the cooling unit 17. The upper beam part 27 moves integrally with the upper part 17c of the cooling unit 17 toward the engine compartment in the rearward direction of the vehicle body. The upper beam part 27 can thereby prevent the upper part 17c of the cooling unit 17 from directly interfering with the engine or other drive source (not shown), and the upper part 17c of the cooling unit 17 is protected from being damaged.

In this manner, the entire cooling unit 17 is moved in the rearward direction of the vehicle body, and the upper beam part 27 is slidably moved integrally with the upper part 17c of the cooling unit 17 in the rearward direction of the vehicle body, whereby the cooling unit 17 can be even more effectively prevented from being damaged in the case of a light collision.

As described above, an upper load receiving part 41e that protrudes in the rearward direction of the vehicle body is provided to the left upper support bracket 41, and a lower load receiving part 42b that protrudes in the in the forward direction of the vehicle body is provided to the left lower support bracket 42. Therefore, an impact load during a light collision can be received at an early stage by the upper and lower load receiving parts 41e, 42b. The entire cooling unit 17 is thereby moved at an early stage in the rearward direction of the vehicle body and the cooling unit 17 can be more effectively prevented from being damaged.

The rearward-moving load (F1+F2) that causes the upper beam part 27 and the left lower support bracket 42 to both slidably move in the rearward direction of the vehicle body is less than the buckling load of the left front side frame 1. Therefore, the entire cooling unit 17 can be made to reliably move in the rearward direction of the vehicle body prior to the left front side frame 11 buckling and deforming. The entire cooling unit 17 is thereby effectively moved in the rearward direction of the vehicle body and the cooling unit 17 can be more effectively prevented from being damaged.

Next, the reason for bisecting the left side leg part 25 into the lower leg part 31 and the upper leg part 32 will be describe with reference to FIG. 6.

For example, it is generally known that substantially the upper half of the left side leg part 25 deforms when the vehicle is involved in a light collision. It is therefore preferred that substantially the upper half of the left side leg part 25 be detachably mounted.

In view of the above, the left side leg part 25 is bisected into the lower leg part 31 and the upper leg part 32. The lower leg part 31, which does not deform during a light collision, is securely joined to the left subframe bracket 14 by, e.g., spot welding. In addition, the left end part 26a of the lower beam part 26 is securely joined to the lower end part 31b of the lower leg part 31 and the bottom part 14b (FIG. 4) of the left subframe bracket 14 by, e.g., spot welding. The rigidity of the vehicle front structure 10 (the front part of the vehicle body in particular) can thereby be assured.

The lower leg part 31 can be mounted on the left subframe bracket 14 without the use of numerous bolts by securely providing the lower leg part 31 to the left subframe bracket 14 and the lower beam part 26, and the lower leg part 31 can be securely mounted in a simple operation to the left subframe bracket 14.

On the other hand, the upper leg part 32, which deforms during a light collision, is detachably joined to the lower leg part 31 using a plurality of bolts 34. The left upper side frame 13 and the upper beam part 27 are detachably joined to the upper end part 32b of the upper leg part 32 using the first and second upper bolts 35, 36 and the lateral bolt 37. When the upper leg part 32 has deformed due to a light collision, the deformed upper leg part 32 can thereby be replaced by a new member in a simple operation by merely removing the bolts 34 to 37, and repair can be simplified.

Next, a vehicle front structure according to a second embodiment will be described with reference to FIGS. 10A and 10B. In the description of the second embodiment, the same reference numerals are used for the same or similar constituent members as those of the vehicle front structure 10 according to the first embodiment and a description thereof is omitted.

Figure 10A:
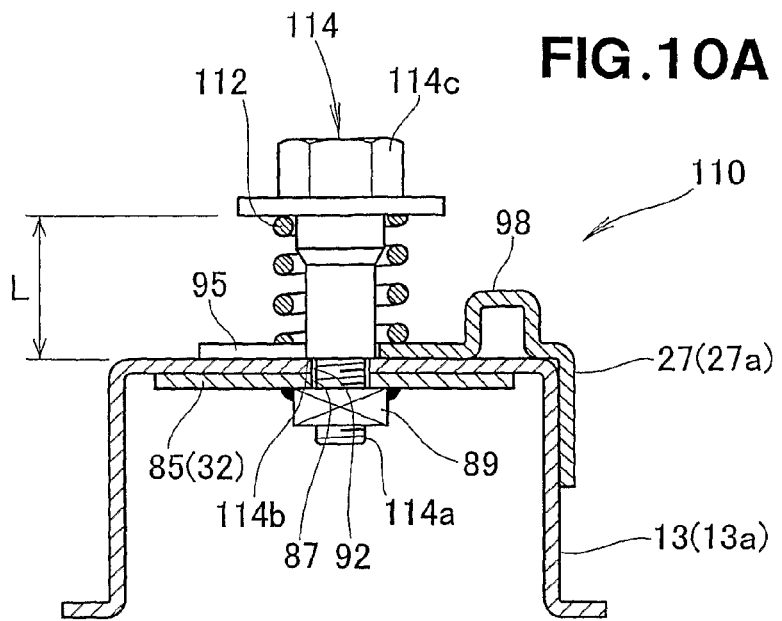
FIGS. 10A and 10B are schematic cross-sectional views showing the vehicle front structure according to a second embodiment of the present invention.
Figure 10B:
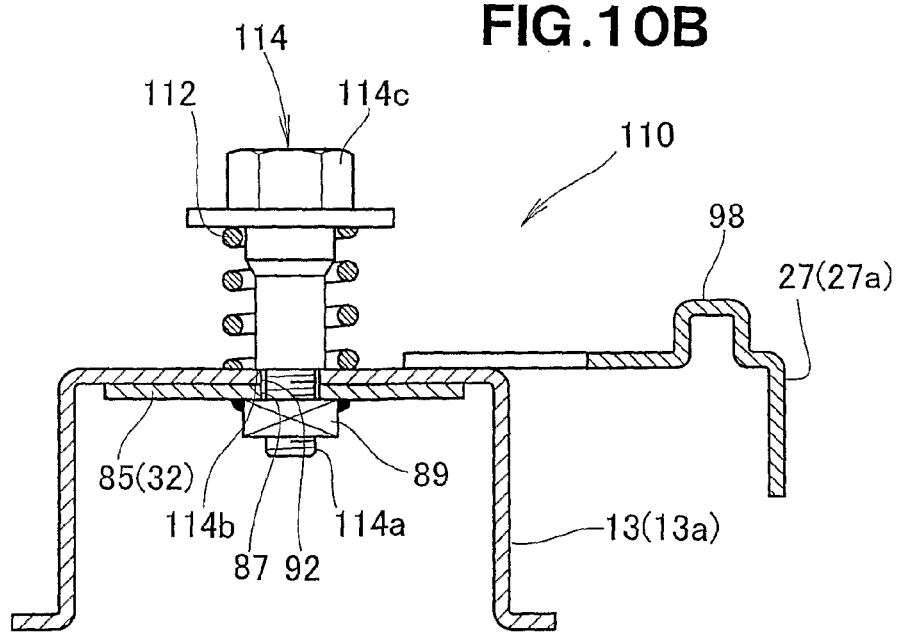

FIG. 10A shows a state in which the left upper side frame 13 and the upper beam part 27 is joined to the upper leg part 32, and FIG. 10B shows a state in which the upper beam part 27 slid in the rearward direction of the vehicle body.

A vehicle front structure 110 according to the second embodiment has the left upper side frame 13 and the upper beam part 27 joined to the upper leg part 32 using a compression spring 112, and the left lower support bracket 42 is joined to the lower beam part 26 shown in FIG. 4 using the compression spring 112.

An example in which the left upper side frame 13 of the upper beam part 27 are joined to the upper leg part 32 will be described below as a typical example of joining using the compression spring 112

The compression spring 112 is fitted onto a shoulder bolt 114 and a thread part 114a of the shoulder bolt 114 is inserted into the mounting hole 92 of the left upper side frame 13 and the mounting hole 87 of the horizontal mounting plate 85, and is threadably joined with the nut 89, as shown in FIG. 10A.

The shoulder part 114b of the shoulder bolt 114 makes contact with the front end part 13a of the left upper side frame 13, and the shoulder bolt 114 is mounted onto the horizontal mounting plate 85 and the left upper side frame 13.

In this state, the compression spring 112 is compressed by the upper beam part 27 and a head part 114c of the shoulder bolt 114. The left upper side frame 13 and the upper beam part 27 are supported by the upper leg part 32 by the spring force of the compression spring 112.

The support force of the upper beam part 27 can be more suitably maintained and adjusted by supporting the upper beam part 27 using the spring force of the compression spring 112.

The upper beam part 27 can thereby be made to smoothly slide in the rearward direction of the vehicle body against the spring force of the compression spring 112, as shown in FIG. 10B, when the vehicle has engaged in a light collision and an impact load has acted on the upper beam part 27.

Here, the left lower support bracket 42 is also supported on the lower beam part 26 in the same manner as the upper beam part 27 by the spring force of the compression spring 112. Therefore, the left lower support bracket 42 can thereby be made to smoothly slide in the rearward direction of the vehicle body against the spring force of the compression spring 112 when an impact load has acted on the left lower support bracket 42.

In this manner, the upper beam part 27 and the left lower support bracket 42 can be made to smoothly slide in the rearward direction of the vehicle body, and the entire cooling unit 17 shown in FIG. 1 can be made to slide in the rearward direction of the vehicle body.

The spring force of the compression spring 112 can be adjusted by varying the shoulder length L (see FIG. 10A) of the shoulder bolt 114. Therefore, the spring force of the compression spring 112 can be easily adjusted so that the upper beam part 27 and the left lower support bracket 42 can be made to smoothly slide.

In the first and second embodiments, an example was described in which the upper beam part 27 and the left and right lower support brackets 42 are slidably supported in the rearward direction of the vehicle body, but no limitation is imposed thereby, and the same effect can be obtained by deformably supporting the upper beam part 27 and the left and right lower support brackets 42 in the rearward direction of the vehicle body.

This configuration is one in which the upper beam part 27 and the left upper side frame 13, for example, are connected as an integral member using the left end part 27a and the front end part 13a, respectively, and the integral member (the upper beam part 27 and the left upper side frame 13) is mounted on the front part of the vehicle by welding (spot welding) or by using replaceable bolts.

In the case of a light collision, the integral member (the upper beam part 27 and the left upper side frame 13) is deforms as a single unit, the upper beam part 27 is moved in the rearward direction of the vehicle body, and the cooling unit 17 can be effectively prevented from being damaged.

After a light collision, the integral member (the upper beam part 27 and the left upper side frame 13) can be replaced by a new member in a simple manner.

In the second embodiment, an example of a configuration was shown in which the upper beam part 27 and the left lower support bracket 42 are joined by using a spring member 112, but the configuration is not limited to joining by using a spring member 112.

In the second embodiment, the compression spring 112 was used as an example of the spring member, but no limitation is imposed thereby, and a hard rubber or another member provided with spring elasticity can be used.

In the first and second embodiments, an example was shown in which the upper leg part 32 of the left side leg part 25 is detachably joined to the lower leg part 31 and the upper beam part 27 using the plurality of bolts 34, 35, 36, 37, but no limitation is imposed thereby, and reducing the number of spot welding locations in joining the parts can provide the same detachable joining as with bolting and yield the same effect as with bolting.

The work of removing the welds when components are replaced can be improved by selecting locations for the spot welds that allow an easy approach for the "removal tool" for removing the welds.

In the first and second embodiments, the upper leg part 32 of the left side leg part 25 was used as an example of a location in which damage is readily incurred when the vehicle is involved in a light collision, but the damaged upper beam part 27 can be replaced with a new component in a simple manner by removing the plurality of bolts 35, 36, 37, and ease of repair can be enhanced.

The intermediate bolt 34, the first and second upper bolts 35, 36, the lateral bolt 37, the first to third lower bolts 51 to 53, and a bolt 118 described in the first and second embodiments are not limited to the numbers given as examples in the first and second embodiments, and the numbers may be suitably varied based on the vehicle to which application is to be made.

The shapes of the left front side frame 11, the left upper member 12, the left upper side frame 13, the left subframe bracket 14, the bulkhead 15, the cooling unit 17, the left side leg part 25, the lower beam part 26, the upper beam part 27, the lower leg part 31, the upper leg part 32, the left upper support bracket 41, the upper load receiving part 41e, the left lower support bracket 42, the lower load receiving part 42b, the compression spring 112, and the like described as examples in the first and second embodiments may be suitably varied based on the vehicle to which application is to be made.

INDUSTRIAL APPLICABILITY

The vehicle front structure of this invention is suitable for use in an automobile provided with a cooling unit on a bulkhead.

The invention claimed is:
1. A front structure of a vehicle, comprising:
left and right front side frames extending in a longitudinal direction of a vehicle body;
a bulkhead provided between the left and right front side frames; and
a cooling unit provided on the bulkhead and having an upper part and a lower part,
wherein the upper part of the cooling unit is supported by an upper beam part of the bulkhead via an upper support bracket, the upper beam part being supported slidably or deformably in a rearward direction of the vehicle body, and the lower part of the cooling unit is supported by a lower beam part of the bulkhead via a lower support bracket which is supported slidably or deformably in the rearward direction of the vehicle body, so that each of the upper beam part and the lower support bracket moves in the rearward direction of the vehicle body when the vehicle is involved in a collision,
and wherein the bulkhead is mounted to an upper side frame provided on an upper member disposed outside of each of the left and right front side frames and to a subframe bracket provided on each of the left and right front side frames, and includes a side leg part provided on the subframe bracket, the upper beam part being provided on the side leg part, the side leg part is halved into an upper leg part and a lower leg part disposed one above the other, the upper leg part is detachably joined to the lower leg part, and the upper beam part and the upper side frame are detachably joined to an upper end part of the upper leg part.

2. The front structure of claim 1, wherein the lower leg part is joined to the subframe bracket by spot welding.

3. The front structure of claim 1, wherein the upper leg part is detachably joined to the lower leg part via a plurality of bolts, and the upper end part of the upper leg part is detachably joined to the upper beam part and the upper side frame via a plurality of bolts.

\* \* \* \* \*